United States Patent [19]

Watanabe

[11] 3,840,280
[45] Oct. 8, 1974

[54] COMPENSATION VALVE DEVICE FOR A LOAD SENSING VALVE

[75] Inventor: Namio Watanabe, Iwatsuki, Japan

[73] Assignee: Akebono Brake Industry Co., Ltd., Tokyo, Japan

[22] Filed: Apr. 5, 1973

[21] Appl. No.: 348,020

[30] Foreign Application Priority Data
Apr. 19, 1972 Japan.............................. 47-39245

[52] U.S. Cl................. 303/22 R, 188/195, 303/6 C
[51] Int. Cl.............................................. B60t 8/18
[58] Field of Search...... 303/22 R, 22 A, 6 C, 84 A, 303/84 R; 188/195; 137/599

[56] References Cited
UNITED STATES PATENTS

| | | | |
|---|---|---|---|
| 3,149,886 | 9/1964 | Dorner.............................. | 303/22 A |
| 3,362,758 | 1/1968 | Goerke et al. ..................... | 303/22 R |
| 3,503,657 | 3/1970 | MacDuff........................... | 303/22 R |
| 3,701,616 | 10/1972 | Kawai .............................. | 303/22 R |
| 3,762,776 | 10/1973 | Kawabe............................ | 303/22 R |

Primary Examiner—Trygve M. Blix
Assistant Examiner—D. C. Butler
Attorney, Agent, or Firm—McGlew and Tuttle

[57] ABSTRACT

In a load sensing valve installed between a master cylinder and rear wheel brakes of a motor vehicle, having first and second fluid chambers connected respectively to the master cylinder and to the rear wheel brakes, a compensating valve device is provided in a bypass arranged between the first and second fluid chambers. A load sensing lever of the load sensing valve is connected to a compensating valve lever of the compensating valve device through a load spring. The compensating valve lever presses a compensating valve piston of the compensating valve device under the force of the load spring in such a manner as to normally close the valve of the compensating valve device. In the event of breakage in the load spring or lever and pin mechanism connected thereto, causing the loss of the spring force or a decrease thereof to a degree lower than a certain value, the valve of the compensating valve device is opened by the fluid pressures of the first and second fluid chambers provided in the compensating valve device, so that the fluid pressure from the master cylinder can be supplied to the rear wheel brakes through the compensating valve device.

7 Claims, 3 Drawing Figures

COMPENSATION VALVE DEVICE FOR A LOAD SENSING VALVE

BACKGROUND OF INVENTION

In a load sensing valve controlling the fluid pressure supply to rear wheel brakes in a vehicle in accordance with the load on the rear wheel axle, a load sensing lever which senses the load on the rear wheel axle exerts a pushing pressure on a load sensing piston. When there is any breakage in a spring or a link mechanism, however, the pushing pressure of the load sensing lever decreases to an excessive degree. Then, the fluid pressure being supplied to the rear wheel brakes also decreases extremely, thus bringing the rear wheel brakes into a virtually no braking condition. To avoid such a hazardous condition, a compensating valve device which compensates for the loss of the function of the load sensing valve, is provided in a bypass connecting first and second fluid chambers of the load sensing valve, so that a sufficient braking force can be secured for the rear wheels.

SUMMARY OF INVENTION

An object of this invention is to provide a compensating valve device which prevents a non-braking condition when fluid pressure supply to rear wheel brakes decreases due to the breakage of the spring and/or lever and pin mechanism connected to a load spring of a load sensing valve employed in a brake system for a vehicle.

Another object of this invention is to provide a compensating valve device, in combination with a load sensing valve, wherein a load sensing lever of the load sensing valve and a compensating valve lever of the compensating valve device are connected to each other through a load spring, the compensating valve lever presses a compensating valve piston of the compensating valve device under the force of the load spring in such a way as to normally close the compensating valve, and, when the load spring or the lever and pin mechanism connected thereto, breaks thus causing either the loss of the spring force or a decrease thereof to a degree less than a certain value, the compensating valve is opened by the fluid pressures of first and second fluid chambers provided in the compensating valve device.

A further object of this invention is to provide a compensating valve device wherein a compensating valve piston, which fits in a compensating valve cylinder, is provided with a flange, is so arranged as to engage a shoulder of the cylinder to form a stop which ensures not only a compact structure but also an effective functioning when the piston is released from the pressure of the compensating valve lever.

A still further object of this invention is to provide a simple, reliable means of opening and closing a valve element comprising a ball which fits into a recess in the end of a compensating valve piston, a corresponding fluid passage which is provided in a plug, and a space which is provided between the ball and the recess in the piston in such a manner as to ensure the automatic alignment of the ball with the fluid passage.

For an understanding of the principles of the invention, reference is made to the following description of a typical embodiment thereof as illustrated in the accompanying drawings.

DETAILED DESCRIPTION OF INVENTION

This invention relates to a compensating valve device which compensates an excessive decrease of fluid pressure that arises from the breakage of a spring or a lever mechanism in a load sensing valve controlling the fluid pressure supply to rear wheel brakes in proportion to the load on the rear wheel axle of a vehicle.

In the conventional load sensing valve, an extremely reduced fluid pressure is supplied to the rear wheel brakes when there occurs breakage of a part such as a load spring, a lever, a pin, etc. or other similar troubles. Such a trouble results in a virtually no braking state and is very hazardous. The compensating valve device of this invention eliminates such a hazard by supplying a fluid pressure equal to that of front wheel brakes from the master cylinder to the rear wheel brakes when the above stated trouble arises so that a sufficient brake force can be secured for the rear wheels.

It is a feature of the invented compensating valve device that the first and second passages respectively leading to the first fluid chamber on the input side and the second fluid chamber on the output side of a load sensing valve are respectively connected to the first fluid chamber and the second chamber of the compensating valve device, and, between the first and second fluid chamber of the compensating valve device, there is a valve element which normally stays closed but opens to let the fluid pressure on the inlet side pass on to the outlet side when the load sensing valve fails to function.

Another feature of the invented compensating valve device lies in that the end of the piston which fits in the small diameter portion of a compensating valve clyinder of the valve device is in pressed contact with the edge of a compensating valve lever which is pivotally connected to a fixed vehicle element such as a mounting plate or a body and is arranged to close the valve element by the under the force of a load spring through the lever and the piston, and that the valve element is opened by the fluid pressure in the compensating valve device when there occurs breakage in a spring or lever mechanism.

It is a further feature of the invented device that the piston which fits in the cylinder is provided with a flange which engages a shoulder of the cylinder thus hindering the piston from moving further toward the above stated compensating valve lever.

Figure 1:
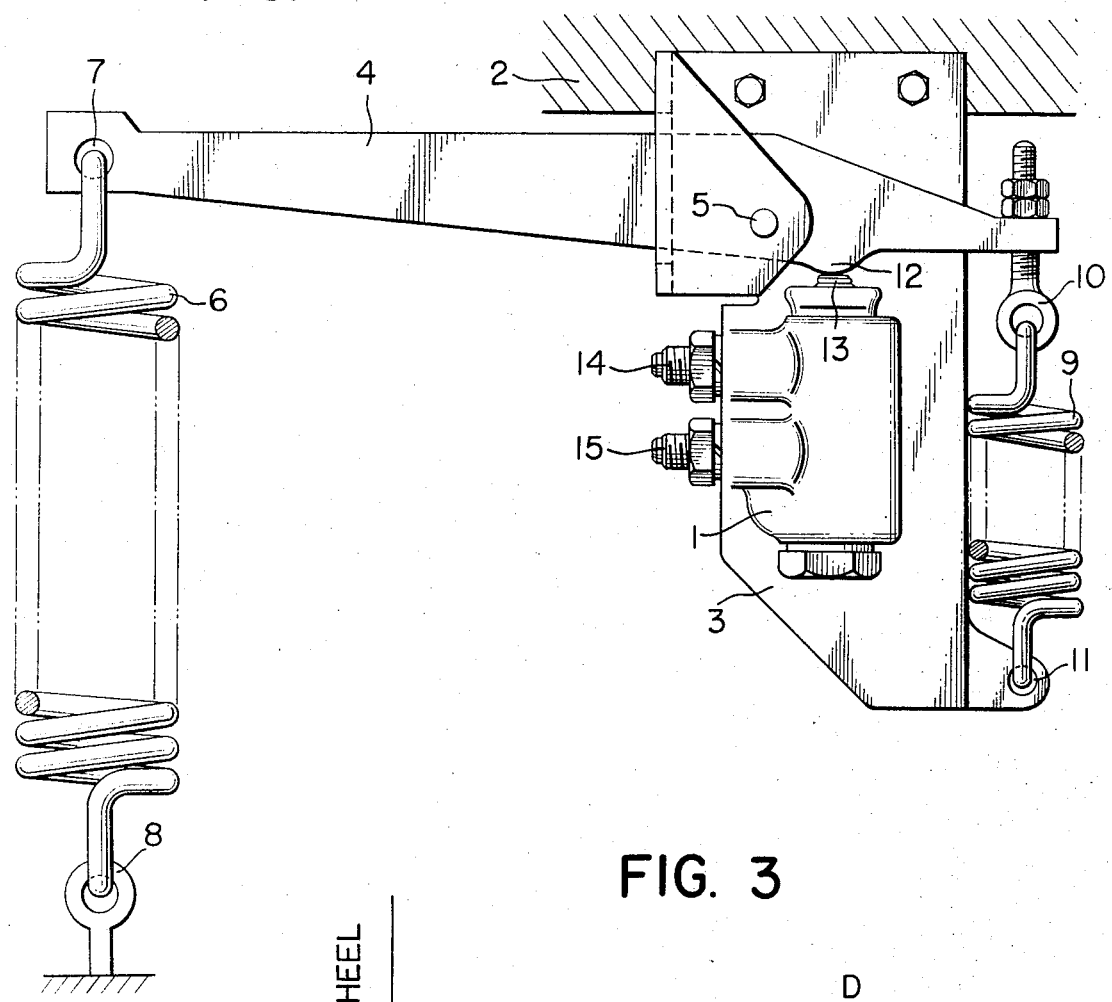
FIG. 1 is an elevation view of a load sensing valve and associated parts.

Referring to the accompanying drawings, FIG. 1 shows the mounted state of a load sensing valve. The load sensing valve 1 is mounted on a mounting plate 3, which is fixed to the structural frame 2 of a vehicle. A load sensing lever 4 is connected to the plate 3 by a pin 5. An operating spring 6 is stretched in between a hole 7 provided in one end of the load sensing lever 4 and a hook 8 fixed on the rear wheel axle. A load spring 9 is stretched in between an eye 10 on the other end of the load sensing lever 4 and a hole 11 in the mounting plate 3. The swell 12 of the load sensing lever 4 presses the top of the stepped piston of the load sensing valve 1. A connector 14 is connected to a master cylinder while another connector 15 is connected to rear wheel brakes.

Figure 2:
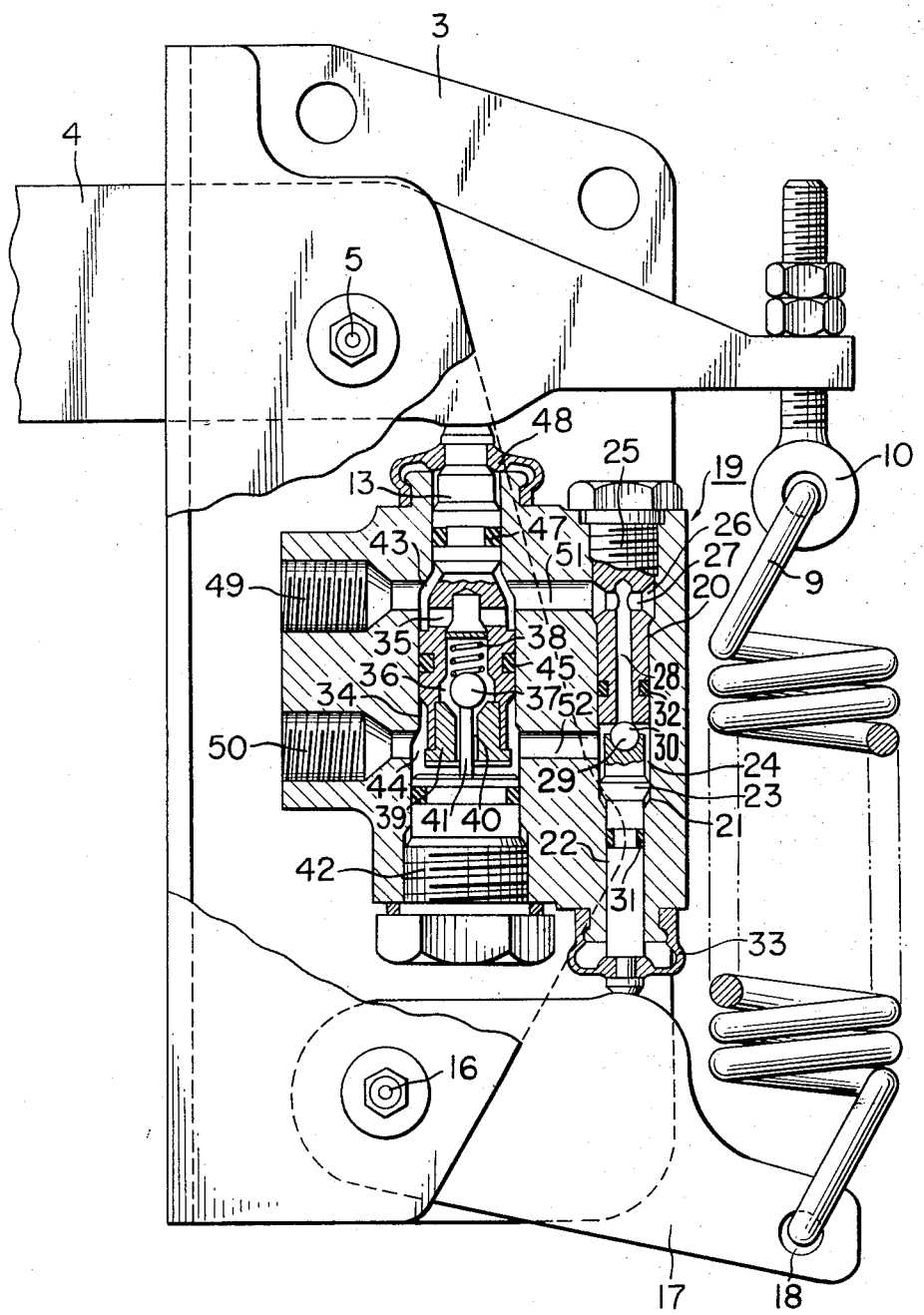
FIG. 2 is an elevation view, partly in section, of a load sensing valve in association with a compensating valve in accordance with the invention.

FIG. 2 shows the invented compensating valve device as combined with a conventional load sensing valve. The operating spring 6 which is shown in FIG. 1 is not shown in FIG. 2 but is positioned in the same manner as in FIG. 1. The load spring 9 stretches between an eye 10 provided on one end of a load sensing lever 14 and a hole 18 provided in a compensating valve lever 17 which is pivotally connected to a mounting plate 3 by a pin 16. The compensating valve lever 17 can pivot upon the pin 16 but is not allowed to pivot upward, being restricted by a compensating valve piston 22. In the compensating valve device 19, one end of the piston 22 which fits in the small diameter part of the stepped cylinder 20 of the device is in contact with the pressing edge of the compensating valve lever 17, and the piston 22 is thus pushed upward by the load spring 9. A plug 25 is screwed to the larger diameter part of the stepped cylinder 20. There is provided a ball 29 between the plug 25 and the piston 22. One end of a passage 28 which is provided in the plug 25 is blocked by the ball 29 and thus the passage is normally kept closed. The ball 29 fits in a recess in the tip of the piston 22. A space is arranged between the ball 29 and the recess in such a way as to ensure that the ball 29 comes to block the passage 28 in alignment therewith. A flange 23 is provided on the piston 22. The flange 23 and the shoulder 21 of the compensating valve cylinder 20 jointly prevent the compensating valve piston 22 from coming out of the cylinder 20 when there arises troubles such as the breakage of the load spring 9. A first passage 51 connects the first fluid chamber 43 in the load sensing valve 1 to the first fluid chamber 26 in the plug 25. A second passage 52 connects the second fluid chamber 44 in the load sensing valve 1 to the second fluid chamber 30 formed by the stepped cylinder 20 and the plug 25. The reference numerals 31 and 32 indicate seals provided between the stepped cylinder 20, the piston 22 and the plug 25, and 33 indicates a boot.

The load sensing valve 1 is composed of a load sensing valve cylinder 34 a stepped piston 13 a passage 35 of the piston 13 a hollow 36 formed by the piston 13 and a valve seat, a ball 37, a valve spring 38, a valve seat 39, a passage 40 provided in the valve seat 39, an opening pin 41, a plug 42, the first and second fluid chambers 42 and 43 formed by the load sensing valve cylinder 34 and the stepped piston 13, seals 45, 46 and 47, a boot 48, an inlet port 49 for the fluid pressure from a master cylinder (not illustrated), and an outlet port 50 for the fluid pressure to be supplied from the second fluid chamber 44 to rear wheel brakes.

The first fluid chamber 43 and the second fluid chamber 44 of the load sensing valve 1 are respectively connected to the first fluid chamber 26 and the second fluid chamber 30 of the compensating valve device 19 through the first passage 51 and the second passage 52 as mentioned in the foregoing.

Without being equipped with the compensating valve device, the load sensing valve operates as follows:

a. When load spring 9 or the lever and pin mechanism connected therewith is in normal condition The fluid pressure from the master cylinder (not shown in the drawings) enters the first fluid chamber 43 of the load sensing valve 1 through the inlet 49 and passes through the passage 35 of the piston, the hollow 36, the gap between the ball 37 and the valve seat 39, the second fluid chamber 44, and the outlet 50 before it is transmitted to the rear wheel brakes. When the fluid pressure increases, the difference in pressure between the first and second fluid chambers 43 and 44 arising from the areal difference between a large diameter and a small diameter overcomes the load on the top of the stepped piston 13 to lift the piston. Since the positions of the ball 37 and the opening pin 41 remain unchanged, the ball 37 comes to contact the valve seat 39. Then there obtains a fluid pressure relation as represented by a line O–A in FIG. 3.

When the fluid pressure in the first fluid chamber 43 further increases, the pressure therein becomes larger than that of the second fluid chamber 44 and thus moves the stepped piston 13 slightly downward. The fluid pressure in the first fluid chamber 43 then enters the second fluid chamber 44 through the gap between the ball 37 and the valve seat 39 and through the passage 40. With the heightened fluid pressure having entered the second fluid chamber 44, the stepped piston 13 is again lifted by the pressure difference between the first and second chambers 43 and 44 and the valve closes as the ball 37 comes in contact with the valve seat 39. The fluid pressure of the rear wheel brakes gradually increases as this operation repeats, and there obtains a fluid pressure relation as represented by a line A–B in FIG. 3.

Figure 3:
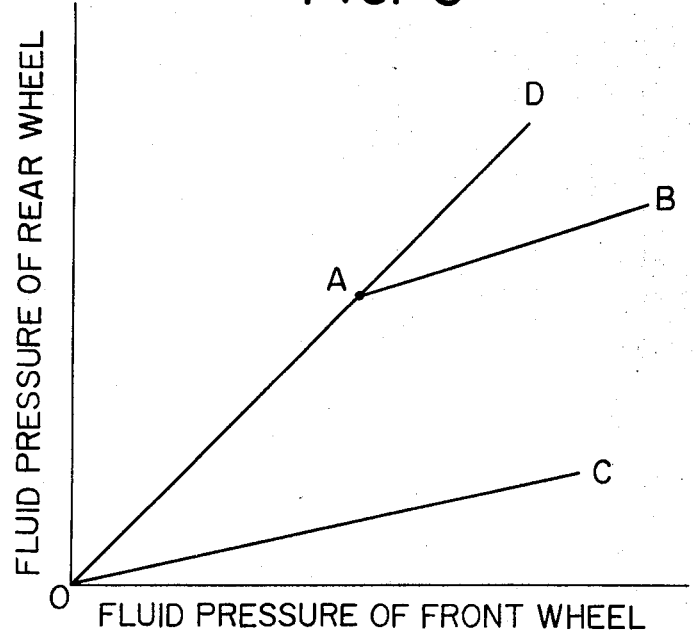
FIG. 3 is a graphical illustration of the relation between the fluid pressure supplied to the rear and front wheels of a vehicle.

Referring to FIG. 3, the point A of the fluid pressure varies with the load applied to the top of the stepped piston 13. When the load increases as in the case of a loaded vehicle, a greater load is applied to the stepped piston 13. Then, in order to let the ball 37 close the valve element by lifting the piston 13, a higher fluid pressure is required in the second fluid chamber 44. Accordingly, a higher fluid pressure is supplied to the rear wheel brakes when a greater load is applied to the piston 13.

b. When load spring 9 or the lever and pin mechanism connected therewith is out of order When a trouble happens in the spring or link mechanism, such as breakage of the load spring 9, pin 16 or lever 4 or 17, the load applied to the top of the stepped piston 13 becomes zero. Then, unlike the above stated loaded condition, there is no longer any pressing force on the stepped piston 13. Under such a condition, in order to close the ball valve 37 by moving the piston 13 upward, a very low fluid pressure of the second chamber 44 suffices for surpassing the fluid pressure applied to the small diameter portion of the piston 13. Therefore, the fluid pressure supplied, under such a condition, to the rear wheel brakes becomes so low that there obtain almost no braking conditions. Such conditions are hazardous particularly in the cases of loaded vehicles. Since the load sensing valve 37 functions in the same manner as under the normal conditions as described above, the description of its function is omitted here. The fluid pressure relation is as represented by a line O–C in FIG. 3.

By contrast, the use of the compensating valve device 19 of this invention in combination with the load sensing valve 1 precludes the hazard of the extremely reduced fluid pressure supply to the rear wheel brakes in the event of the breakage of the spring or link mechanism.

The load sensing valve equipped with the invented compensating valve device operates as described below:

In the compensating valve device 19, the compensating valve lever 17 presses the compensating valve piston 22 under the force of the load spring 19. By this, the ball 29 is placed in the passage 28 of the plug 25, so that the valve is normally closed in opposition to the fluid pressure of the first fluid chamber 26. Under this condition, when trouble arises with a spring or link mechanism, as mentioned in the foregoing, and thus the pressure of the compensating valve lever 17 which has been applied to the compensating valve piston 22 either disappears or drops below a certain value, the fluid pressure in the second fluid chamber 30 acts on the sectional area of the piston 22 to push it downward. In addition to this force, the fluid pressure of the first fluid chamber 26 connected to the master cylinder is exserted on the ball 29 to open the valve and then the fluid pressure within the second fluid chamber 30 pushes piston 22 downwardly. The fluid pressure within the second fluid chamber 30 is supplied to the rear wheel brakes passing through the second passage 52, the second fluid chamber 44 of the load sensing valve and the outlet 50. The fluid pressure relation in this instance is as represented by a line O-D in FIG. 3.

In the embodiment illustrated in FIG. 2, the compensating valve device is combined with the load sensing valve into one unified body. However, the invention is not limited to such, and they may be arranged as separate units.

What is claimed is:

1. In a load sensing valve device for the rear brakes of a vehicle having a body and axles including at least one rear axle, the load sensing valve device including a cylinder fixed to the vehicle body and having a first valve chamber for connection to a source of brake fluid subjected to pressure and a second valve chamber for connection to the rear brakes, a sensing valve piston axially displaceable in the cylinder in a valving portion thereof and regulating the flow of fluid between the first and second valve chambers, a load sensing lever pivoted intermediate its ends to the vehicle body and engaged with a head of the sensing valve piston, an operating spring connecting one end of the sensing lever to a rear axle, a load spring connected to the other end of the sensing lever, and means connecting the load spring to the vehicle body, and a normally closed compensating valve device communicating with both valve chambers and operable, responsive to breakage of any one of the operating spring, the sensing lever and the load spring, to establish communication between the two valve chambers; an improved compensating valve device comprising, in combination, a second cylinder having respective ports communicating with said first and second valve chambers; a valve mechanism in said second cylinder between said ports and including a compensating valve piston axially displaceable in said second cylinder; and a compensating valve lever, independent of said load sensing lever, pivotally connected at one end to said vehicle body and having its opposite free end connected to said load spring; said compensating valve lever having an intermediate portion engaging said compensating valve piston and, under the bias of said load spring, maintaining said valve mechanism closed to block flow between said ports; said compensating valve lever, responsive to breakage of any one of said operating spring, said sensing lever and said load spring, releasing said compensating valve piston for opening of said valve mechanism to establish a by-pass flow path between said first and second valve chambers and completely independent of said valving portion of said sensing valve device cylinder.

2. An improved compensating valve device, as claimed in claim 1, in which said load sensing valve cylinder and said second cylinder are mounted in parallel on said vehicle body; said head of said sensing valve piston extending in a direction opposite from the portion of said compensating valve piston engaged by said compensating valve lever, whereby said load sensing lever and said compensating valve lever are arranged at opposite ends of the assembly of said sensing valve cylinder and said second cylinder; said load spring interconnecting said other end of said sensing lever and said opposite free end of said compensating valve lever.

3. An improved compensating valve device, as claimed in claim 1, including a plug inserted into said second cylinder and defining a third fluid chamber, said plug having an axial passage therein communicating with said third fluid chamber; said compensating valve piston being inserted in the opposite end of said second cylinder to project therefrom for engagement by said compensating valve lever; said compensating valve piston supporting a ball blocking said passage in said plug; said ball being disposed in a fourth fluid chamber defined by said second cylinder and said compensating valve piston; said third fluid chamber communicating with said first valve chamber and said fourth fluid chamber communicating with said second valve chamber.

4. An improved compensating valve device, as claimed in claim 3, in which said second cylinder has a large diameter portion and a small diameter portion; said plug being threaded into said large diameter portion; said compensating valve piston having a flange thereon engageable with a shoulder between said large diameter portion and said small diameter portion of said second cylinder, to limit outward movement of said compensating valve piston.

5. An improved compensating valve device, as claimed in claim 3, in which said passage in said plug terminates in a valve seat; the end of said compensating valve piston facing said plug being formed with a recess receiving said ball.

6. An improved compensating valve device, as claimed in claim 3, including a body formed with a first passage connecting said third fluid chamber to said first valve chamber and formed with a second passage connecting said fourth fluid chamber to said second valve passage.

7. An improved compensating valve device, as claimed in claim 3, in which, when said compensating valve piston is released by said compensating valve lever, said ball and said compensating valve piston are moved in a valve mechanism opening direction by the difference in the fluid pressure of said third and fourth fluid chambers.

* * * * *